W. B. Barnard,

Wick Trimmer,

No. 2,209, Reissued Mar. 27, 1866.

Inventor:
William B. Barnard
By Robbins & Burr
Atty's.

Witnesses:
H. King
Randolph Coyle Jr.

AM. PHOTO-LITHO. CO. N.Y. (OSBORNE'S PROCESS.)

UNITED STATES PATENT OFFICE.

WILLIAM B. BARNARD, OF WATERBURY, CONNECTICUT.

IMPROVEMENT IN LAMP-TRIMMERS AND SHEARS.

Specification forming part of Letters Patent No. 45,574, dated December 27, 1864; Reissue No. 2,209, dated March 27, 1866.

*To all whom it may concern:*

Be it known that I, WILLIAM B. BARNARD, of Waterbury, in the county of New Haven and State of Connecticut, have invented certain new and useful Improvements in the Manufacture of Lamp-Trimmers, Shears, and Similar Cutting-Instruments; and I do hereby declare that the following is a full and exact description thereof, reference being had to the accompanying drawings, forming a part of this specification, and in which—

Figure 1:
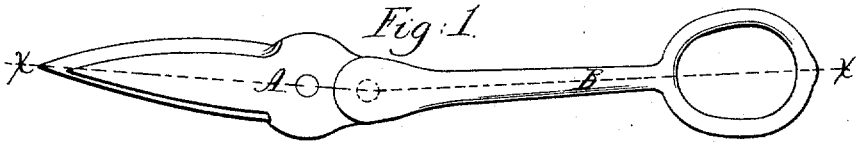
Figure 2:
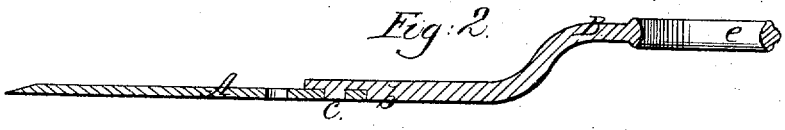
Figure 3:
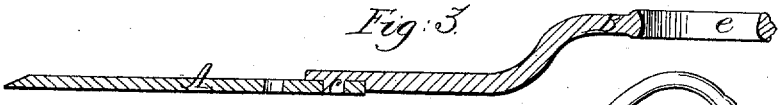

Figure 1 is a plan view of one of the handles of a pair of lamp-trimmers with the cutting-blade attached; Fig. 2, a longitudinal section in the line *x x* of Fig. 1; Fig. 3, a similar section, showing the blade and handle when riveted together and before the blade is ground down and finished; and Fig. 4, a plan view of a finished pair of lamp-trimmers opened.

Similar letters indicate like parts in each of the drawings.

My invention consists, in the first place, of a novel mode of uniting the handles and blades of lamp-trimmers and similar instruments. By means thereof steel blades, fully tempered from end to end, may be firmly united to handles formed of wrought or malleable iron, or its equivalent, and be subsequently ground to an edge and finished without injury to the ordinary offsets or shoulders usually formed upon the opposite faces of each division of the shears.

In the second place, in so forming the handles of shears as that there shall be no offset or shoulder upon the contiguous faces of each half of the instruments to simplify their construction and lessen their cost.

Figure 4:
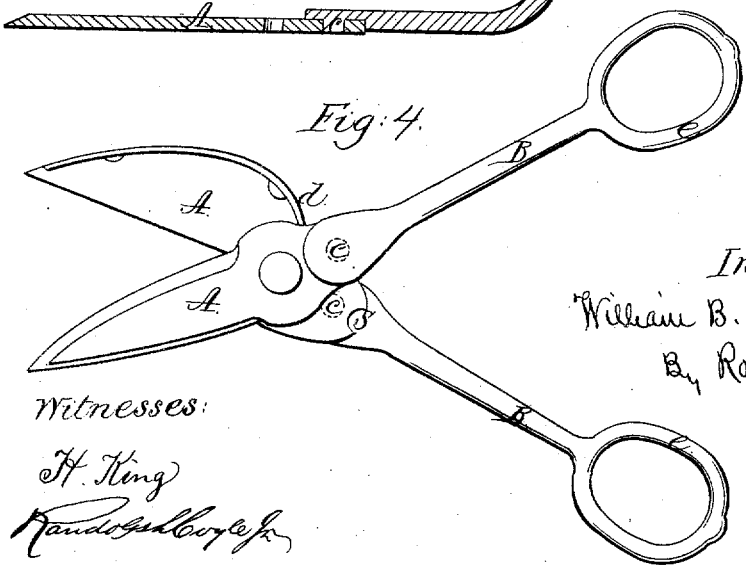

The handles B B of my improved shears may be made of wrought or malleable iron, brass, or other suitable metal. Their ends are rabbeted, as seen in the sectional Fig. 2, to receive the ends of the steel blades, and are each furnished with a rivet, *c*, which, projecting from the rabbet, passes through an aperture pierced in the blade A to receive it, and is headed upon the exterior surface thereof. Two rivets may be used; but a sufficiently secure joint is obtained with a single rivet, *c*, by forming a tongue or projection, *s*, upon the inner edge of the rabbet which shall fit into a corresponding notch or recess in the end of the blade, as shown in Fig. 4, or by so forming the rabbet as that it shall constitute a recess embracing the end of the blade, so as to prevent the blade from turning on the rivet or rivets.

In the ordinary mode of manufacturing lamp-trimmers, &c., it has been necessary that that end of the steel blade which is to be secured to the handle should be left soft, (although the remainder of the blade was hardened,) both to facilitate the union of the blade and handle in welding and to permit this portion of the blade to be finished with a file, so as to avoid the injury to the offsets or shoulders ordinarily adopted to prevent the overlapping of the ends of the shear-blades, which would result from an attempt to do so with the grindstone used in forming the edge of the blade. To temper the cutting end only, each blade must be taken up singly in tongs or pinchers and be but partially immersed in the tempering-bath—an operation requiring time and care, and consequently involving a material cost.

In my new invention, wherein I unite the blade to the handle by means of one or more rivets, in combination with a rabbet or recess upon the handle and suitable rivet-holes in the blade, as heretofore described, the blade may be hardened and tempered throughout before uniting it to the handle, and then firmly secured without a secondary heating thereof, which might injure its temper, while I am enabled thereby also to secure the ends of the blades far enough from the shoulders or offsets, if such be used, as that the blades may be wholly ground and finished without touching these offsets. By this means I am enabled to temper a quantity of blades at once by throwing them altogether from the heating-pans immediately into the tempering-bath, instead of dipping them singly. Again, instead of using the ordinary offsets to prevent the overlapping of the ends of the blades, I avoid the labor, trouble, and expense of forming and fitting them by so forming the handles as that the contact of the finger-bows *e e*, Fig. 4, shall effect this object, and by placing a simple stop upon one arm (or in lamp-trimmers a guard, *d*, Fig. 4) to prevent the blades from opening too wide. Thus I am enabled not only to produce instruments more perfect and uniform in finish and temper than those heretofore made, but can supply them to the public at a much less cost.

Having thus fully described my invention, what I claim therein as new, and desire to secure by Letters Patent, is—

The construction of shears or lamp-trimmers substantially in the manner herein set forth.

The foregoing specification of my improvement in the manufacture of lamp-trimmers, shears, &c., signed by me this 9th day of February, A. D. 1866.

WM. B. BARNARD.

In presence of—
ROBT. CRANE,
JOHN W. PAUL.